(12) United States Patent
Lehman

(10) Patent No.: US 6,203,043 B1
(45) Date of Patent: Mar. 20, 2001

(54) FOUR-WHEEL, HUMAN POWERED CYCLE

(76) Inventor: James A. Lehman, 4423 Black Otter Trail, Dallas, TX (US) 75287

(*) Notice: Subject to any disclaimer, the term of this patent is extended or adjusted under 35 U.S.C. 154(b) by 0 days.

(21) Appl. No.: 09/235,884

(22) Filed: Jan. 22, 1999

(51) Int. Cl.$^7$ ............................................. B62K 5/00
(52) U.S. Cl. .................. 280/288.1; 280/261; 280/267; 280/282; 280/124.141; 280/124.136
(58) Field of Search .................. 280/259, 260, 280/263, 267, 269, 282, 288.1, 283, 268, 261, 242.1, 220, 124.141, 124.136, 250

(56) References Cited

U.S. PATENT DOCUMENTS

| | | |
|---|---|---|
| 1,659,517 | 2/1928 | Cornil . |
| 3,498,634 | 3/1970 | Sheldon . |
| 3,986,725 | 10/1976 | Terry . |
| 4,165,094 * | 8/1979 | Onda ..................................... 280/269 |
| 4,456,277 * | 6/1984 | Carpenter .............................. 280/282 |
| 4,674,762 | 6/1987 | Nelson et al. . |
| 5,209,506 * | 5/1993 | Klopenstein .......................... 280/269 |
| 5,284,355 | 2/1994 | Ishii . |
| 5,326,121 | 7/1994 | Fisher . |
| 5,327,989 * | 7/1994 | Furuhashi et al. .................... 180/908 |
| 5,354,084 * | 10/1994 | Lofgren et al. ....................... 280/250 |
| 5,397,145 | 3/1995 | Kobluk . |
| 5,544,906 * | 8/1996 | Clapper ............................. 280/288.1 |
| 5,762,351 | 6/1998 | SooHoo . |
| 5,901,973 * | 5/1999 | Warren ................................. 280/260 |
| 6,036,210 * | 3/2000 | Lee ....................................... 280/250 |

* cited by examiner

Primary Examiner—Lanna Mai
Assistant Examiner—Ruth Ilan
(74) Attorney, Agent, or Firm—Marc A. Hubbard; Munsch Hardt Kopf & Harr, P.C.

(57) ABSTRACT

A semi-recumbent, human powered, four wheel cycle has an independent front suspension and wheels that are turned. A conventional bicycle chain drive drives one or both front wheels. The rear wheels are also driven in additional embodiments.

21 Claims, 11 Drawing Sheets

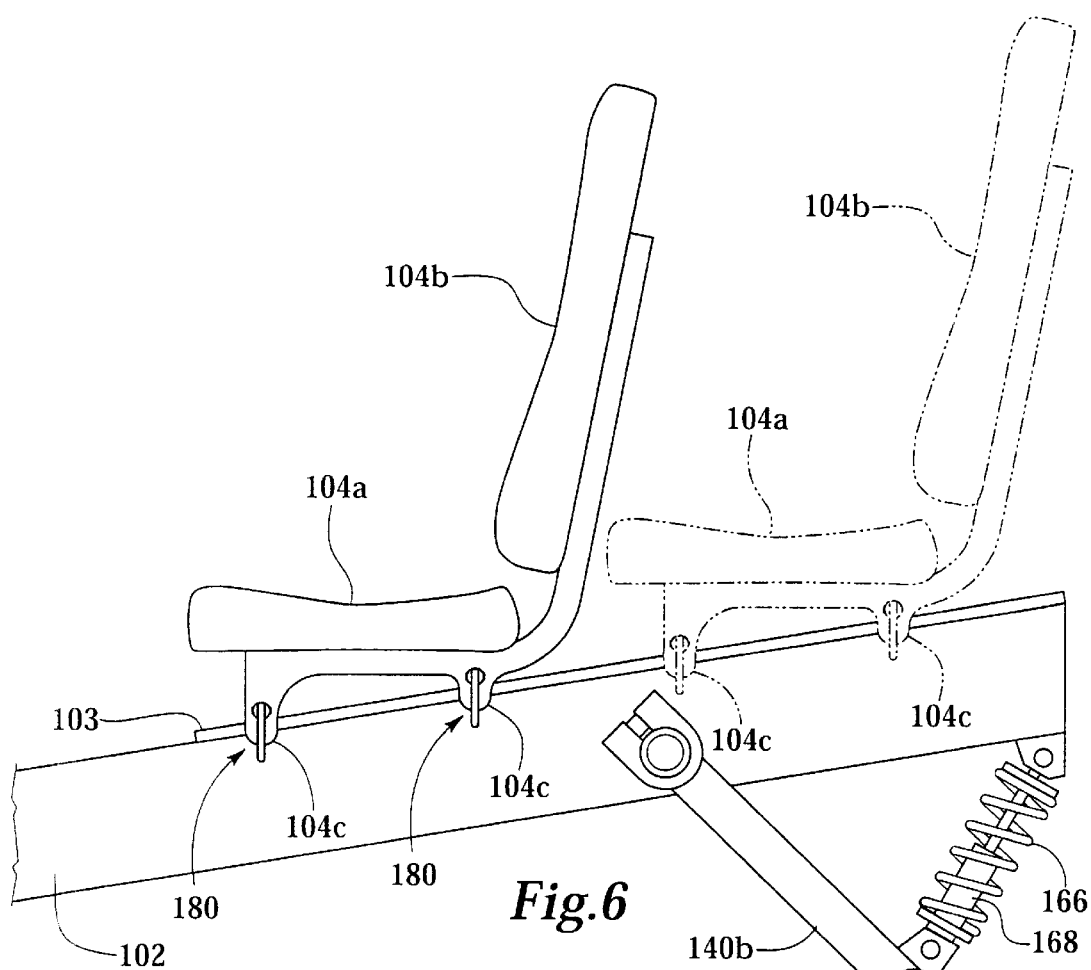
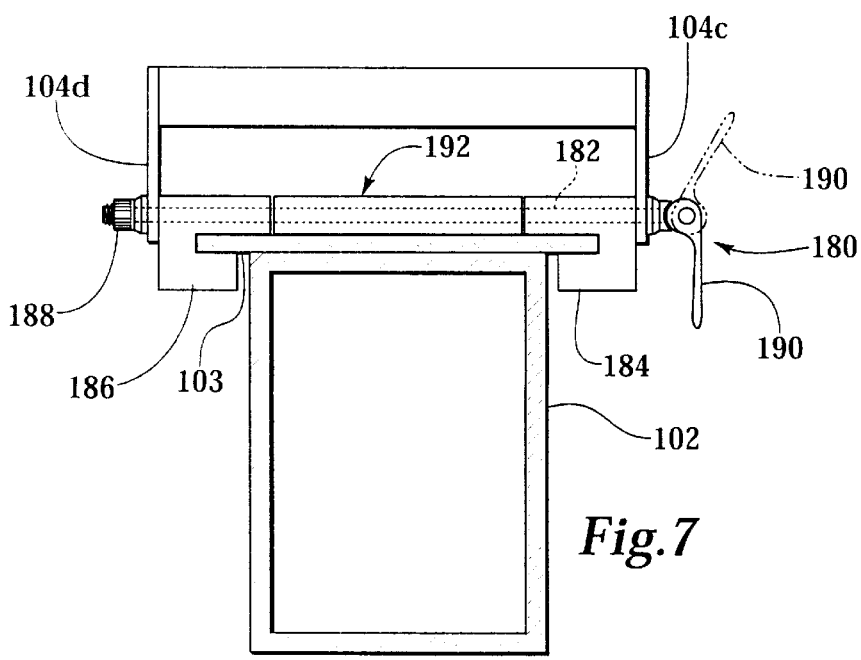

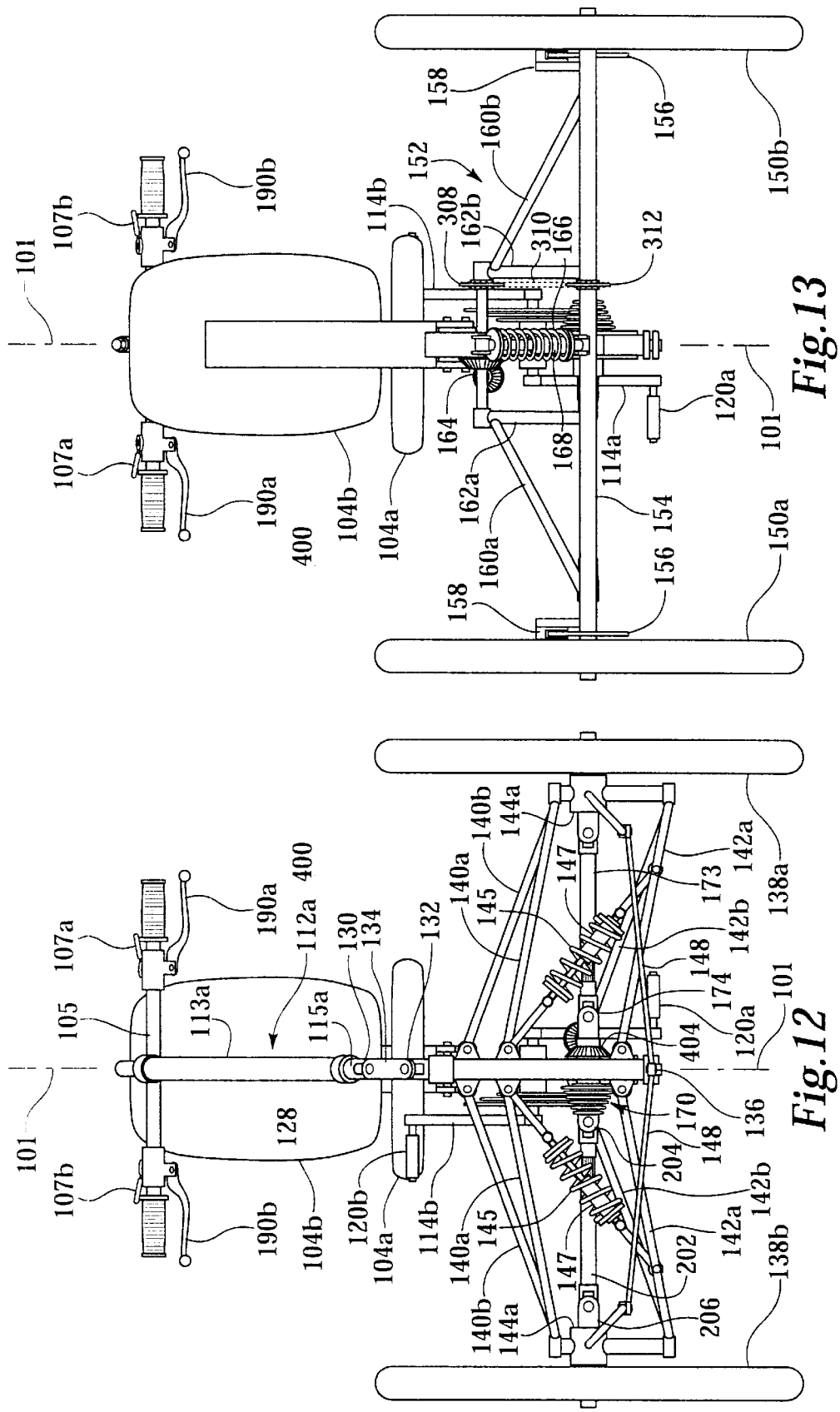

FOUR-WHEEL, HUMAN POWERED CYCLE

FIELD OF INVENTION

The present invention relates, generally, to semi-recumbent, four-wheel, human powered cycles.

BACKGROUND OF THE INVENTION

Bicycles of semi-recumbent configuration have potential for greater comfort and speed than conventional bicycles that are ridden with upright posture. However, due to their configuration, semi-recumbent bicycles are more awkward to ride and significant practice is required of experienced riders of conventional bicycles to transition to them. For example, many of the long and short wheel base semi-recumbent bicycles have handlebars for steering mounted on a pivot point beneath the rider. Other semi-recumbent bicycles—mostly those with long wheel bases—have handle bars extending rearwardly from steering shafts mounted in a steering head positioned well forward of the rider. The result of this configuration is that the rider's hands sweep through a large radius arch, in the manner of a tiller on a boat, when steering rather than rotating about a near central pivot point as is typical of a conventional bicycle.

Semi-recumbent, four-wheel cycles are, on the other hand, stable and easy to ride. However, known primarily as utilitarian vehicles, they have been relegated to use in industrial applications for transportation of materials and people in novelty rental fleets near destination resorts and vacation areas. For many reasons they are not satisfactory for bicycle enthusiasts who ride for exercise and sport. For example, a typical four-wheel cycle has a frame constructed of jig-welded heavy steel tubing in a ladder frame configuration. Thus, it is comparatively very heavy and not considered portable by bicycle standards. Due to its weight and size, it cannot be easily carried atop an automobile like a bicycle in a roof top carrier. Outfitted with a canopy for sun or rain protection, relatively small wheels (e.g. 20" or smaller in diameter) and high gearing, the typical four-wheel cycle is intended to move only at modest speeds.

Furthermore, a typical four wheel cycle has one or both rear wheels driven using a chain drive system with sprockets that requires a long chain run length from the pedaling cranks to the rear wheels. Its ladder frame configuration usually has a fixed seat or an adjustable seat that moves along the ladder frame to accommodate riders of varying leg length. However, it does not compensate for torso length for steering purposes, thus placing the steering wheel or bars in an awkward position for many people.

Additionally, the typical four-wheel cycle does not have a suspension between the frame and wheels to dampen road shock to the rider and allow the tires to maintain constant contact with the road surface for traction and steering control. Instead it relies only on padding in the seat assembly and relatively thick pneumatic tires to dampen shocks to the rider. Without suspension, the framing and wheel sets must be built heavier and stronger to endure the shocks. Since it is not possible to stand up off the seat, as with a conventional bicycle, it can be very uncomfortable to control at high speeds on standard roadways and on off-road terrain. And, the heavy framing and thick pneumatic tires slow the cycle.

SUMMARY OF THE INVENTION

The objective of the invention is an improved semi-recumbent, four-wheel, human powered cycle that is comfortable to ride and may be ridden by riders with minimal training or practice, and that overcomes one or more of the aforementioned problems with prior art four wheel cycles.

In accordance with one aspect of the invention, a semi-recumbent, four-wheel cycle includes a main frame comprised of a single, stiff beam extending from front to back along the axis of the cycle. To make the beam light, it is hollow and possesses a cross-section of a type that provides good rigidity. Thus, it is comparatively portable, and can be transported by an automobile on a roof top carrier. In a preferred embodiment, the beam possesses a hollow U-shaped or box-shaped cross-section. Front and rear wheel assemblies are attached to opposite ends of the beam, each assembly extending in opposite directions. The wheel assemblies are adjusted so that the beam is inclined from front to rear. A seat is mounted on the beam. Adjustment of the seat along a fore-aft direction will also conveniently result in a vertical adjustment of the seat with respect to a steering column and pedals located in fixed positions with respect to the frame. Thus, the cycle is adaptable to allow riders within a large range of body sizes and proportion to ride comfortably and effectively.

Another aspect of the invention includes a semi-recumbent, four-wheel cycle having a fully independent front suspension assembly that depends from the main frame and is steered. In the preferred embodiment, each of two front wheels is attached to an axle integrated with a steering knuckle. Upper and lower A-frame assemblies are pivotally coupled attached to the cycle's main frame and hold between them the steering knuckle. The load of the cycle is supported by a dampened spring extending between the lower arm and the main frame.

Yet another aspect of the invention includes a semi-recumbent, human-powered four-wheel cycle having one or both front wheels driven. Such an arrangement avoids a long chain drive run to a driven rear wheel and offers the advantages of a steering wheel that is also powered by a drive line. In a preferred embodiment, a front wheel is mounted on a drive axle that passes through support bearings in a steering knuckle. A universal joint couples the drive axle to one end of a splined, telescoping drive shaft. The opposite end of the telescoping drive shaft is coupled through a second universal joint to one end of a drive shaft extension. The drive shaft extension is supported by bearings in a fixed position relative to the main frame. Mounted on the drive shaft is a free-spinning hub and chain drive gear cassette cluster. A common cycle chain drive, sprockets, crank set and chain derailluer system thus can be used in an inverted format to power the front wheel.

Finally, in accordance with yet another aspect of the invention, a semi-recumbent, human-powered four-wheel cycle has all four wheels driven.

These and other aspects and advantages of the invention and its preferred embodiments are described below in connection with the appended drawings, in which:

BRIEF DESCRIPTION OF THE DRAWINGS

FIG. 6 is a side view of a seat portion of the cycle of FIG. 1 showing the seat in two different positions.

FIG. 7 is a partial side view of seat portion of FIG. 6.

FIG. 12 is a front elevation view of the cycle of FIG. 11.

FIG. 13 is a rear elevation view of the cycle of FIG. 11.

In the following description, like numbers refer to like parts.

DETAILED DESCRIPTION

Figure 1:
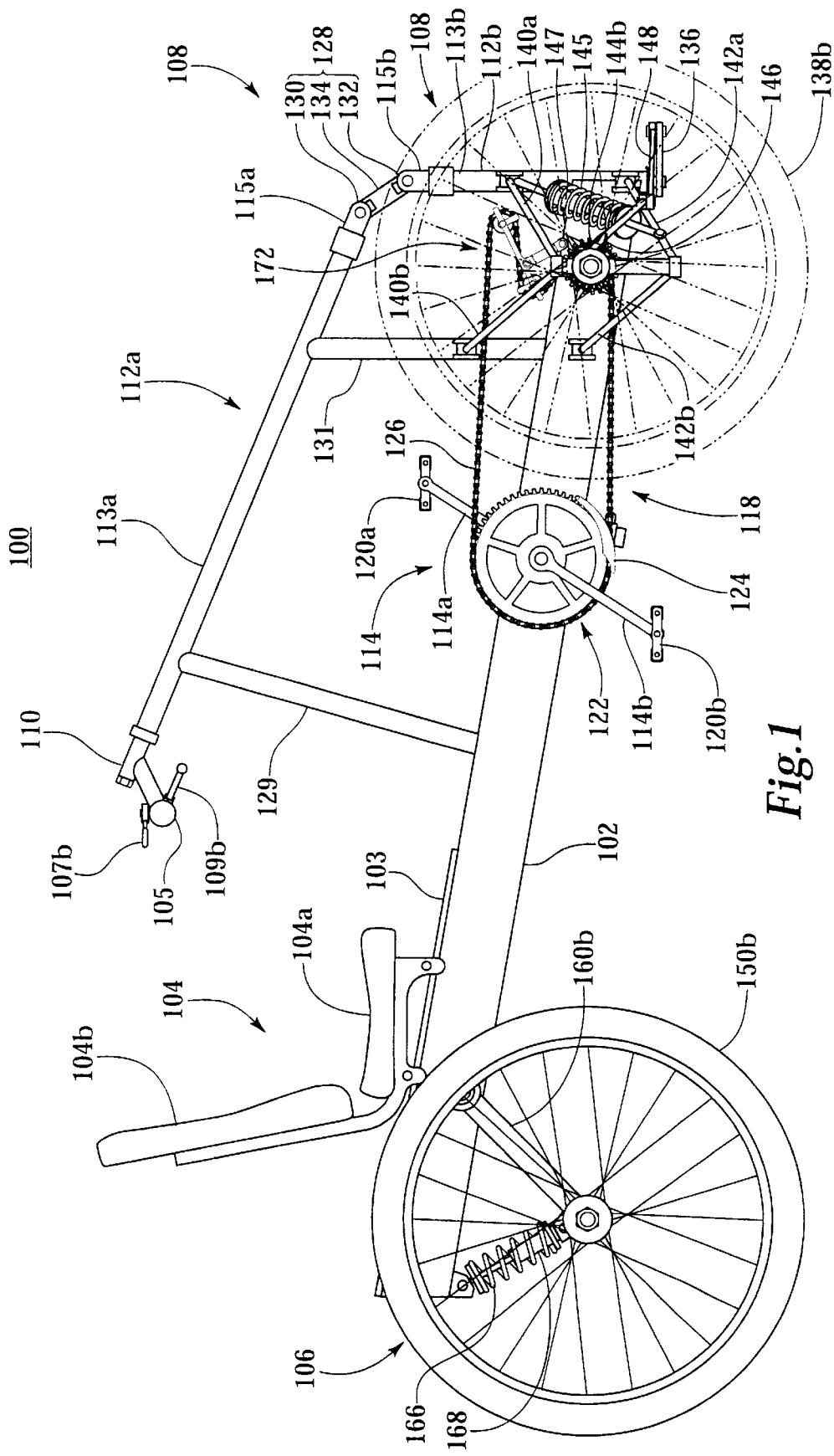
FIG. 1 is a right side, elevation view of a first embodiment four wheel, human powered cycle having one driven front wheel.
Figure 2:
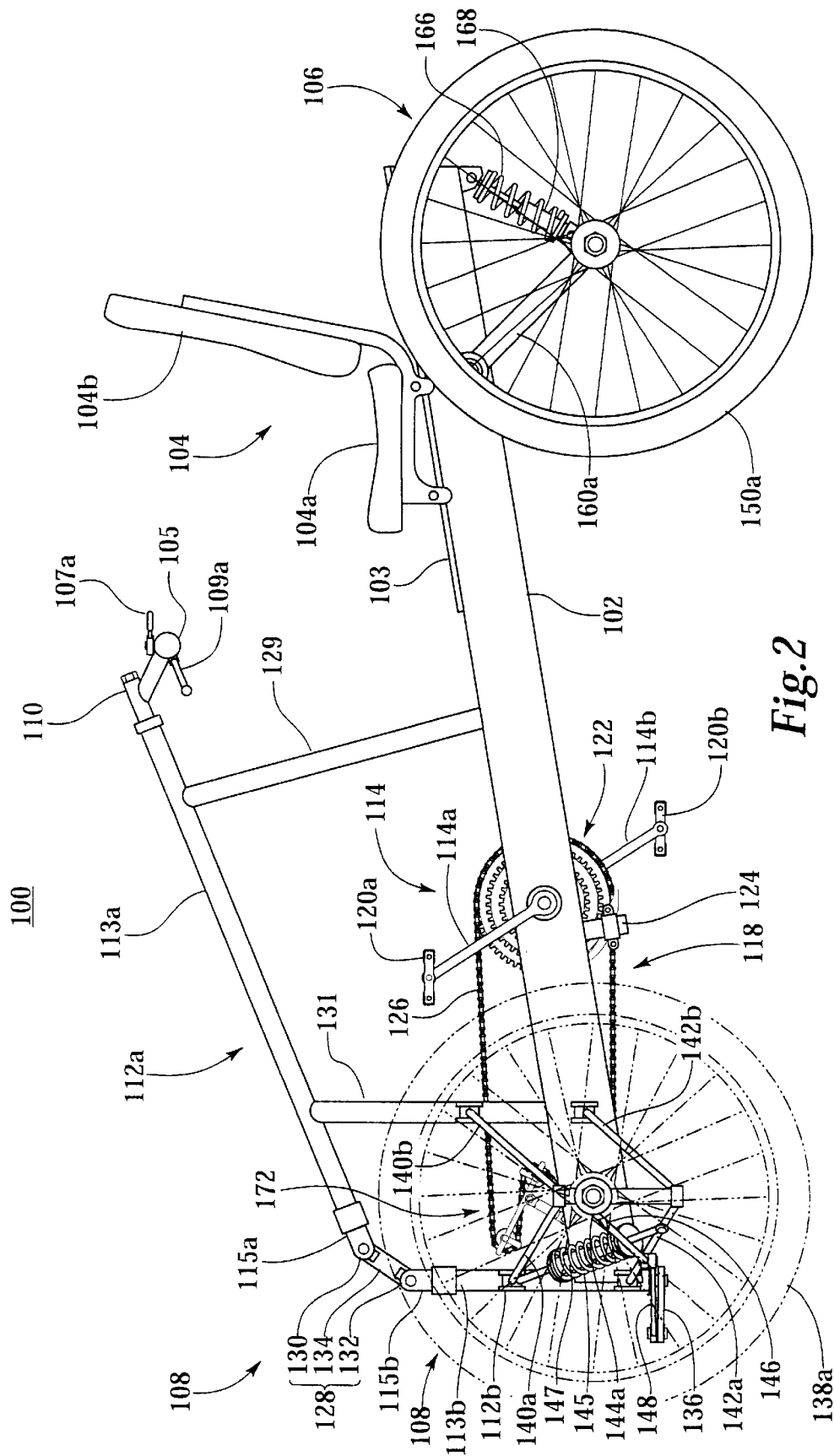
FIG. 2 is a left side elevation view of the cycle of FIG. 1.
Figure 3:
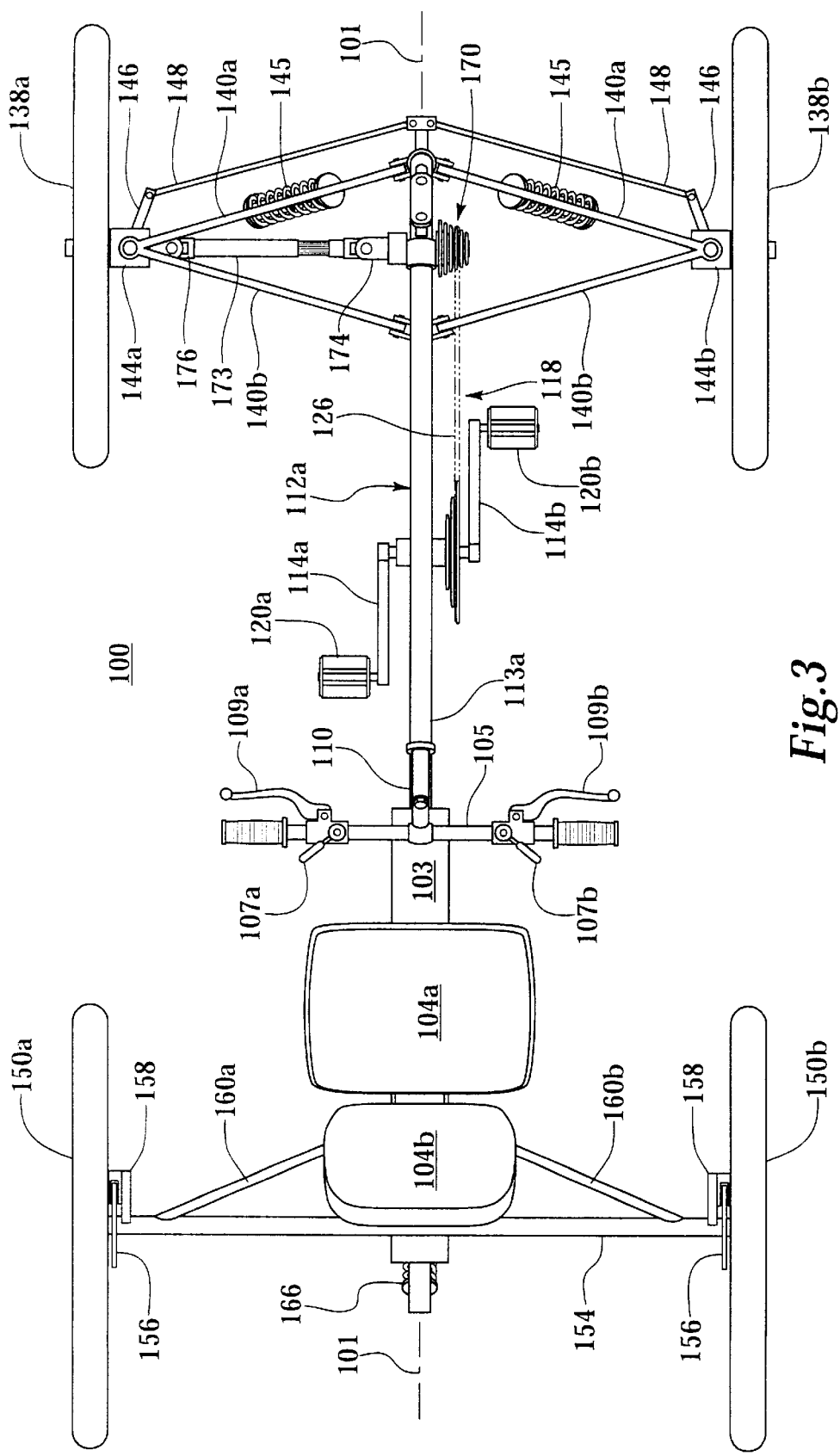
FIG. 3 is a top view of the cycle of FIG. 1.
Figures 4, 5:
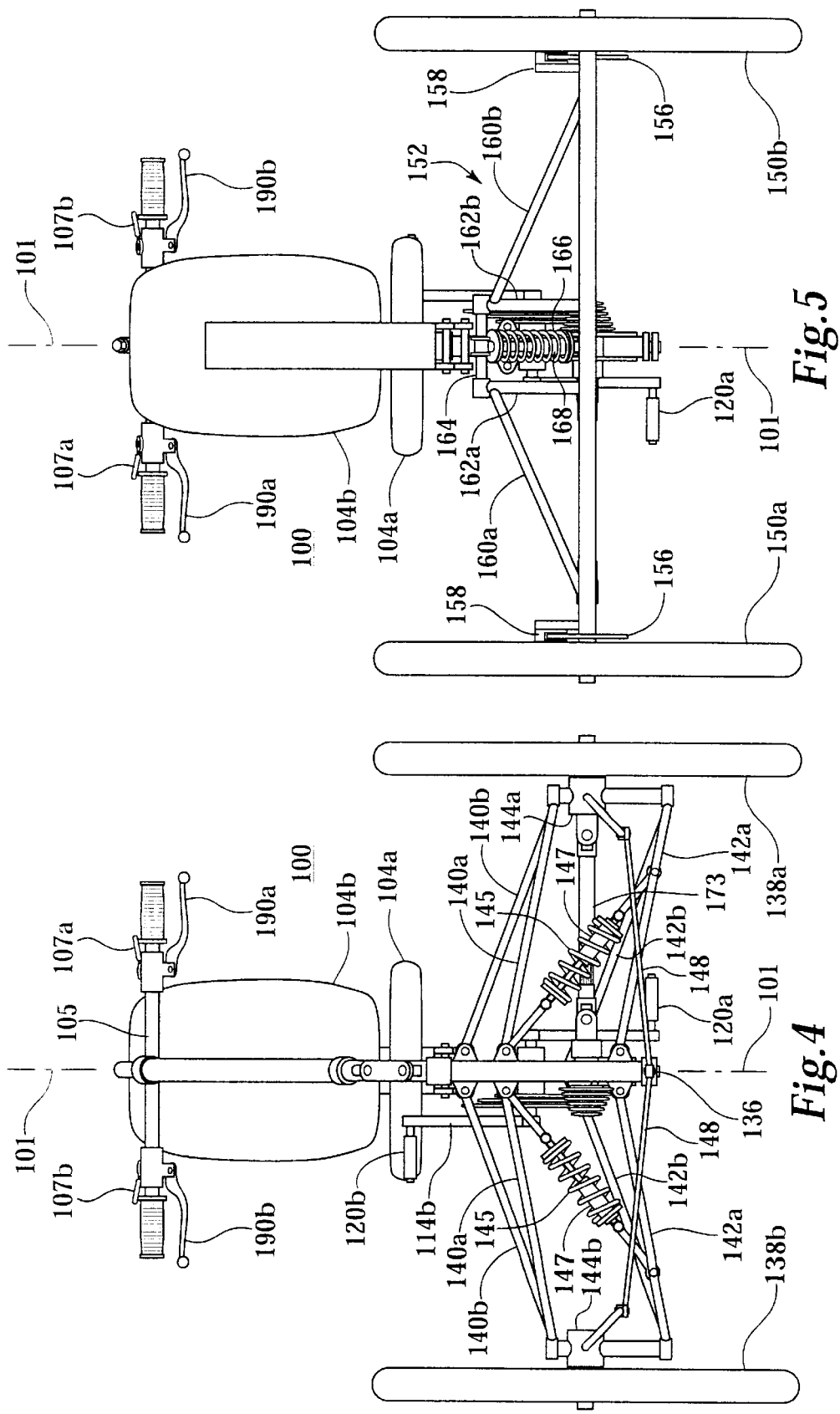
FIG. 4 is a front elevation view of the cycle of FIG. 1.
FIG. 5 is a rear elevation view of the cycle of FIG. 1.
Figure 8:
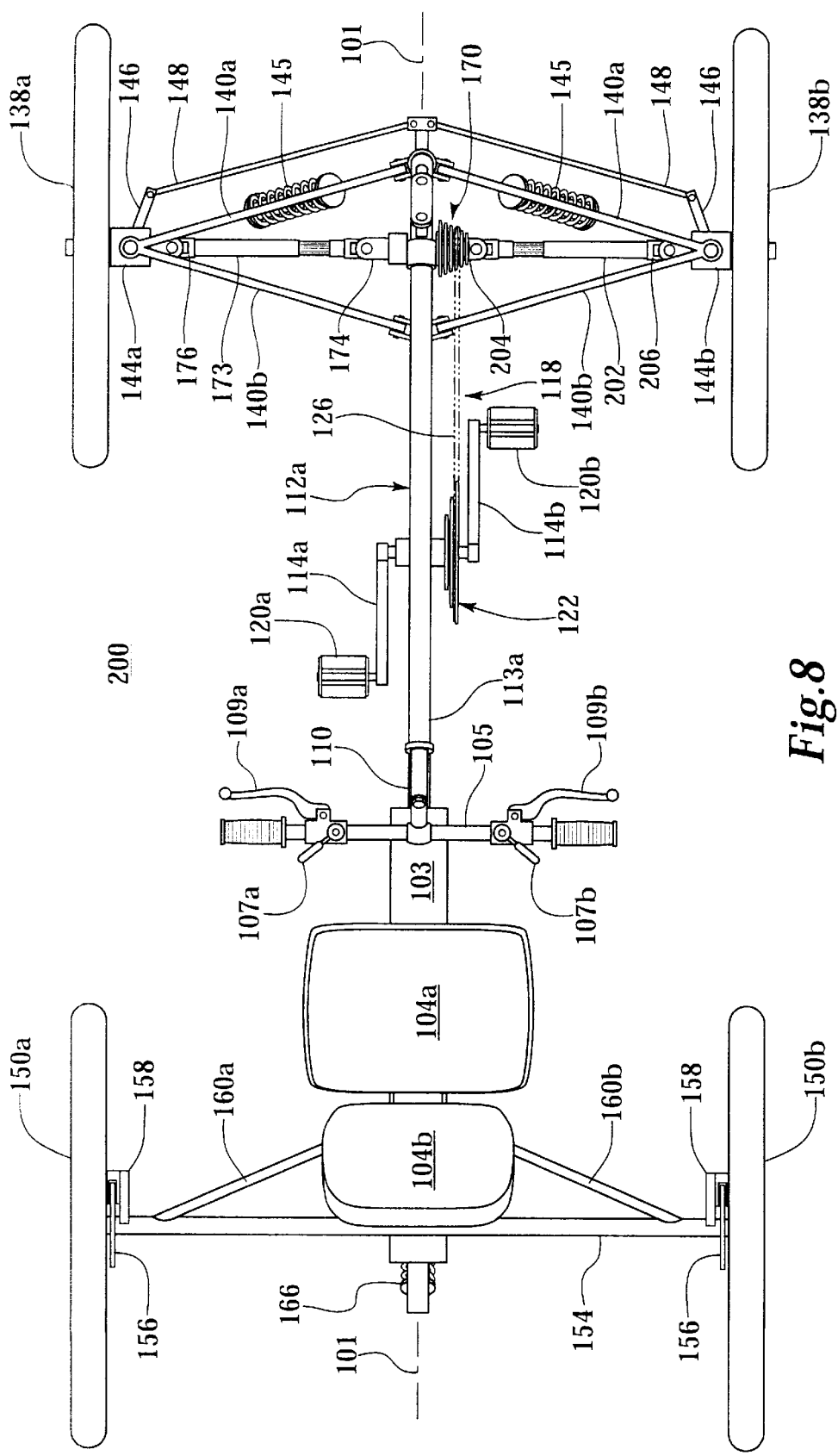
FIG. 8 is a top side view of a second embodiment of a four wheel, human powered cycle having two driven front wheels.
Figure 9:
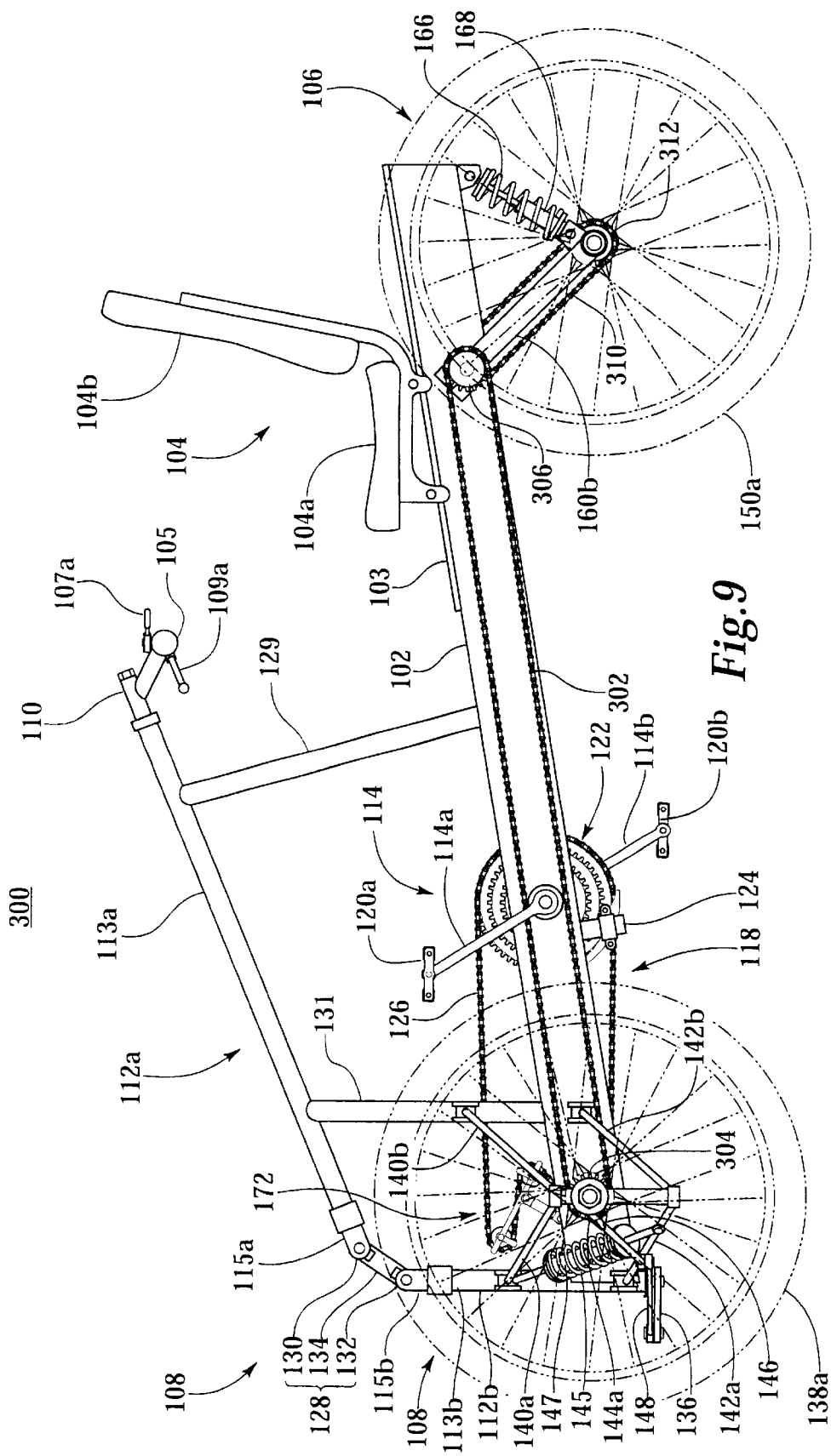
FIG. 9 is a left side elevation view of a third embodiment of a human-powered, four wheel cycle having four driven wheels.
Figure 10:
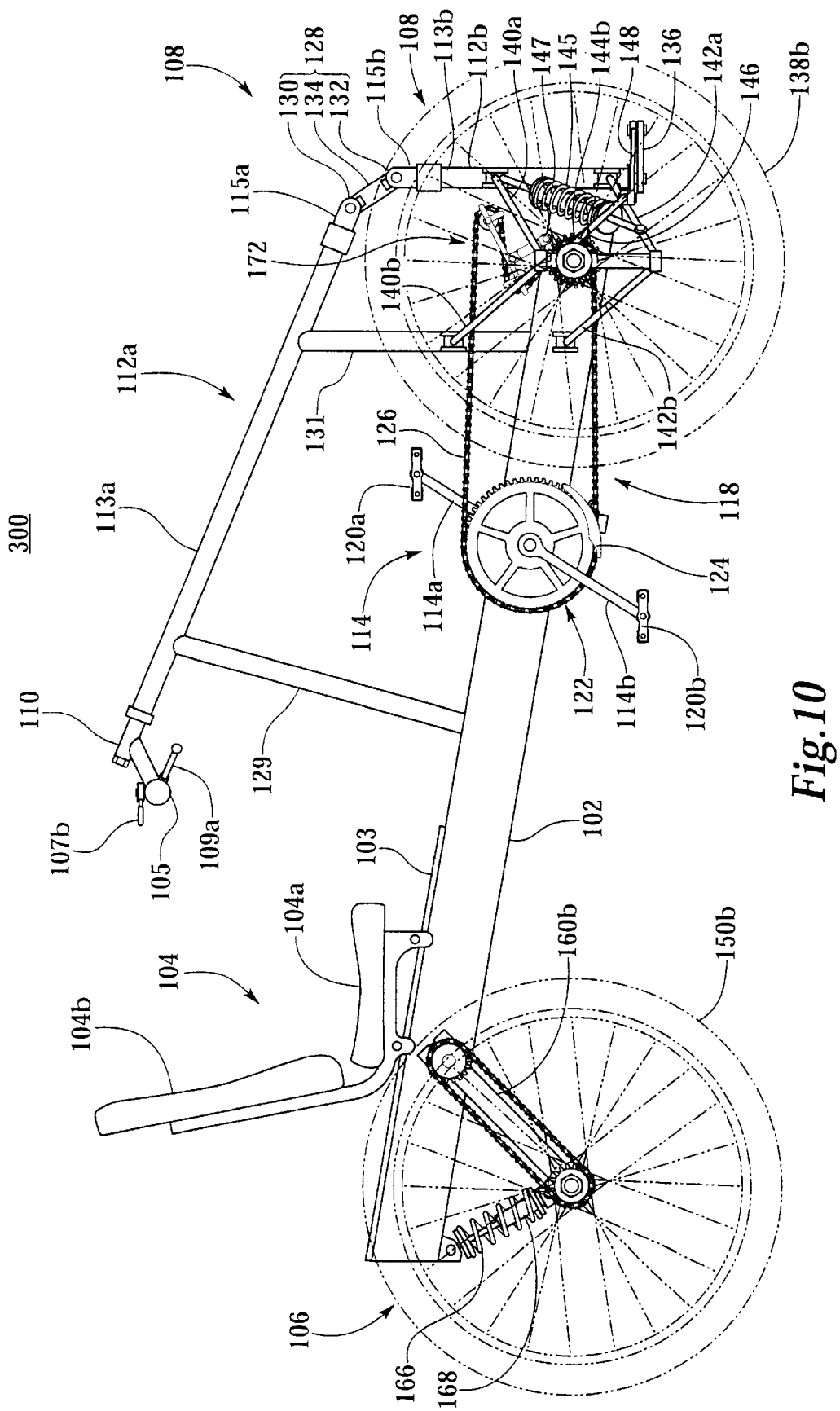
FIG. 10 is a right side elevation view of the cycle of FIG. 9.
Figure 11:
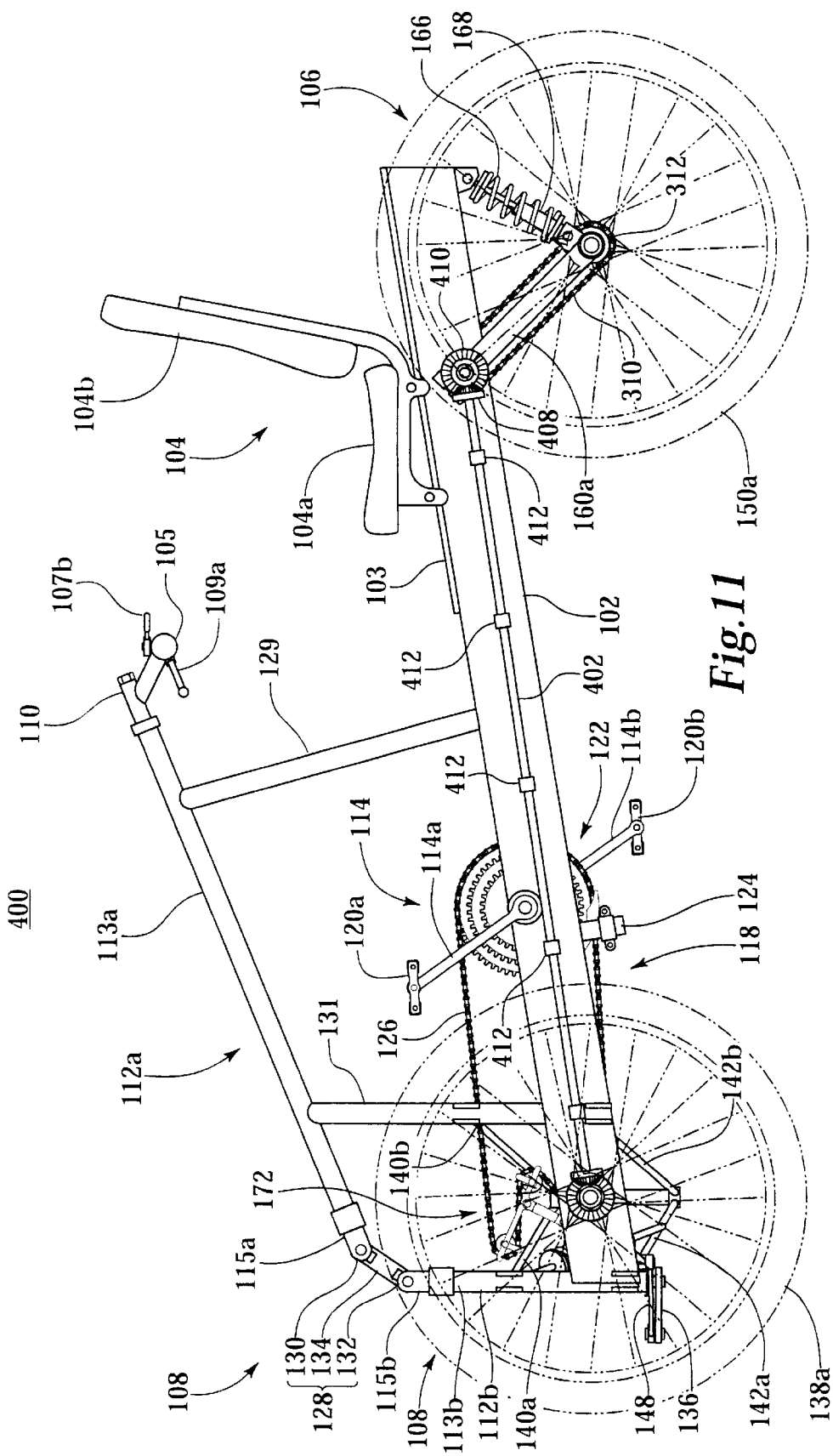
FIG. 11 is a left side elevation view of a fourth embodiment of a human-powered, four wheel cycle having four driven wheels.
Figure 14:
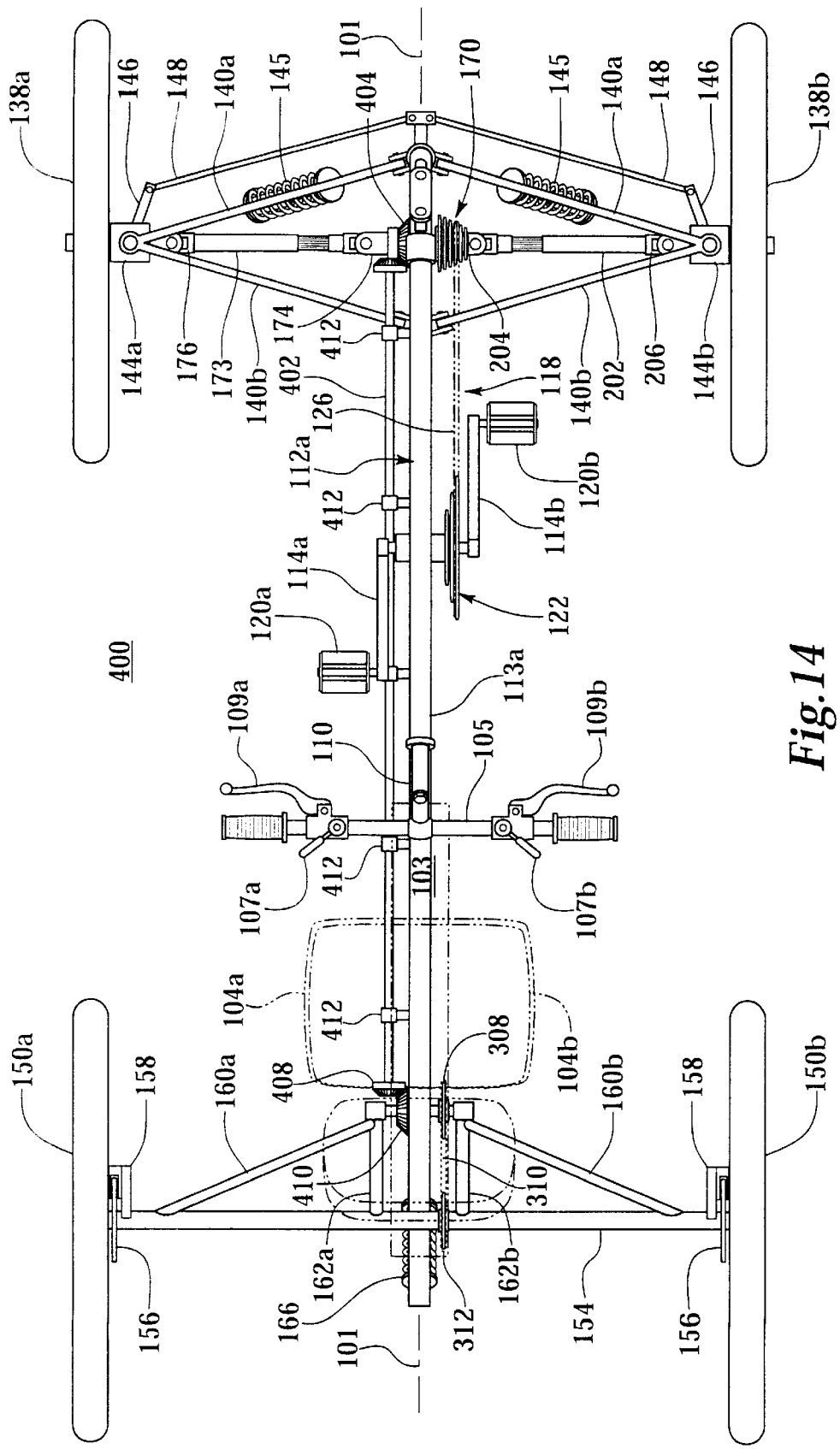
FIG. 14 is a top view of the cycle of FIG. 11.

Referring to FIGS. 1–14, four embodiments of four wheeled, semi-recumbent, human-powered cycles are illustrated. FIGS. 1–5 illustrate a cycle 100 having one driven front wheel. FIG. 8 illustrates a cycle 200 that has each of its two front wheels driven. FIGS. 9 and 10 illustrate a cycle 300, which has all four wheels driven. FIGS. 11–14 illustrates a cycle 400 that also has four driven wheels, but uses a different power train for transmitting power to rear the wheels than cycle 300.

The elements common to each of the four embodiments will be described first. Cycles 100, 200, 300 and 400 each possess a main frame that lies predominately within a vertical plane extending through the cycle's central axis or plane of symmetry, which is generally indicated by line 101 on FIGS. 3, 4, 5, 8, 12, 13 and 14. The main frame is comprised of a central beam 102 extending the length of the cycle along the central axis. The beam is stiff and lightweight. It is preferably hollow, with a square, rectangular or U-shaped cross-section. A seat 104 is mounted to a rear portion of the main frame, behind front wheel assembly 108, but forward of a rear wheel assembly 106 that is also mounted to the rear portion of the main frame. The seat includes a bottom support 104a and a back support 104b that supports a rider in a semi-recumbent position during operation of the cycle.

As shown in detail in FIGS. 6 and 7, seat 104 slides on a track comprised of a plate 103 that is mounted to the top of beam. Two cam clamps 180, one fore and one aft, are used to hold the seat in position on the track. Each clamp includes a threaded rod 182 that passes through a left ear 104c, a left track slide 184, an opposing right track slide 186, and a right ear 104d. The left and right ears are formed by part of the seat frame extending below plate 103. One end of the rod holds a threaded nut 188 and the opposite end holds a threaded cam 190. The threaded cam includes a lever for rotating the cam between an open position (shown in phantom) and closed position. When closed, the cam compresses the ears against the two track slides, which in turn are forced against the edges of a track comprised of plate 103. Friction between the track slides and plate holds the seat in place.

Referring back to FIGS. 1–14, a steering column is comprised of upper section 112a and lower section 112b. Steering stem 110 holds handlebars 105. A wheel or other structure for rotating stem 110 can be used in place of the handlebars 105. Mounted to the handlebars, in a conventional manner, are levers 109a and 109b for controlling braking and levers 107a and 107b for shifting gears. The steering column 112 is comprised of an external tube or housing, generally designated 113, and a steering shaft that is generally designated as 115. Since the steering column is in two sections, the steering shaft 115 is comprised of an upper section 115a and a lower section 115b which rotates within steering tube sections 113a and 113b, respectively. The steering shaft is mechanically coupled with the front wheel assembly 108 such that rotation of the steering shaft causes the front wheel assembly to turn. The plane in which the steering handlebars turn is oriented in a generally vertical direction with respect to the ground on which the cycle sits so that a user can comfortably grasp and turn the steering handlebars while in semi-recumbent position. The upper section 112a is, preferably, straight and angled at twenty (20) degrees relative to the central beam. The steering stem can be extended or retracted within the steering shaft, if desired, to accommodate the user.

Sections 112a and 112b of the steering column are connected through a steering shaft coupling assembly 128. The lower section 112b is attached to the front of the central beam 102. Vertical members 129 and 131 support the upper section 112a and connect it to central beam 102. The vertical support members are attached to central beam 102. The drive shaft coupling assembly includes universal joints 130 and 132 and a short coupling shaft 134 extending between the two universal joints. Two universal joints are used to make the nearly right angle transition between the upper and lower sections of the steering column. However, depending on the particular configuration, a single universal joint could be substituted for the two universal joints and coupling shaft. Connected to the end of the lower steering shaft 115b is a steering control arm 136.

The front wheel assembly 108 includes left front wheel 138a and right front wheel 138b. Each wheel is mounted to the central beam 102 through an independent suspension. Each independent suspension includes an upper A-arm 140 and a lower A-arm 142. Each A-arm includes two members (designated "a" and "b", respectively), the members being joined together at one end to form a "V" shape. The A-arm members are preferably hollow tubes to provide both lightness and strength. The free end of each A-arm member is pivotally mounted to the cycle's main frame at two locations. The upper A-arm 140 is mounted to lower section 113b of the steering column and to the support member 131 for the upper section 112a of the steering column. The free ends of the lower A-arm 142 are pivotally mounted to the central beam 102.

In each independent suspension, the vertices (i.e. the point where the two members of the A-arm join) of the upper and lower A-arms move in a generally vertical direction, within a common plane, with respect to the ground when the cycle is sitting on the ground. Connected between the vertices of the upper and lower A-arms, using spherical joints, is a steering knuckle 144 that pivots about a generally vertical axis, but that incorporates steering axis inclination based on the particular wheel hub and wheel rim size used. A spring 145 extends between the lower A-arm and the main frame. In the illustrated embodiment, one end is pivotally connected to the steering tube 113b at a point below the upper A-arm mounting point. The opposite end of the spring is pivotally connected to member 142a of the lower A-arm between at a point between the main frame and the steering knuckle 144, depending on the amount of leverage desired to operate on the spring. The load of the cycle and the rider is carried, partially, by a spring that extends from the lower A-arm to the main frame. As illustrated, the spring is a spiral spring 145 that is dampened by a shock absorber 147 mounted within the spring. However, an air shock absorber, which is a unitary device that generates both a spring force and a dampening force is equivalent for purposes of the invention to the spring and shock absorber assembly shown in the drawings.

Each of the front wheels 138a and 138b is connected to an axle extending from a respective one the steering knuckles 144a and 144b. As will be subsequently discussed, one or both of the axles will be driven, depending on the embodiment. Connected to each of the steering knuckles 144a and 144b is a steering arm 146 that is moved to pivot the steering knuckle about its axis, and thereby pivot the wheel to which it is mounted. Each steering arm 146 is connected to the steering control arm 136 through a steering linkage 148.

The rear wheel assembly is comprised of a left rear wheel 150a and a right rear wheel 150b that are mounted to swing arm suspension assembly 152. The swing arm assembly includes a horizontal member 154. An axle extends from each end of the horizontal member 154, to which a respective one of the rear wheels is mounted. A disk 156 of a disk brake assembly is connected to the wheel hub of each rear wheel. Each disk brake assembly further includes a caliper 158 mounted to the horizontal member 154. Each caliper is operated by a cable or hydraulic fluid line (not shown) actuated by a respective one of the levers 109a and 109b. Connected to the horizontal member 154 are two A-shaped swing arms. The swing arms and horizontal member form an integrated unit. The left side swing arm is comprised of members 160a and 162a; the right side swing arm is comprised of members 160b and 162b. Each swing arm is connected to axle 164 that is mounted through the central beam 102. Both swing arms and the horizontal member 154 are thereby able to pivot or swing in a unitary manner about an axis perpendicular to the central beam 102. To carry the load of the cycle and its ride, a spring 166 extends between the aft end of the central beam 102 and the horizontal member. The spring is pivotally mounted to the central beam as is also a shock absorber 168 mounted inside the spring for dampening. However, an air shock absorber or other device that generates both a spring force and a dampening force is equivalent to and thus maybe substituted for, the spring and shock absorber shown in the drawings.

A set of cranks 114a and 114b are mounted on opposite ends of a crank shaft 116 extending through main frame 102. The crank powers a conventional bicycle chain drive assembly 118 that is mounted to the main frame in an inverted fashion as so to drive the front wheels. Use of a conventional, bicycle chain drive assembly promotes easy maintenance. Pedals 120a and 120b on the end of the cranks are located forward of the steering handlebars 105 so that they can be comfortably reached by a user sitting on the seat 104 in a semi-recumbent position as the user comfortably grips the steering handlebars. Pedaling the cranks turns a gear cluster 122 comprised of a plurality of sprockets or chain rings 116 that are connected to the crankshaft. Each of the plurality of chain rings has different diameter, allowing a user to select the chain ring that provides the gearing ratio or leverage the user desires. A "front" derailluer 124 is used to move a chain drive 126 between the chain rings on the gear cluster 122. A rider controls the derailluer using one of the levers 107a and 107b that is connected to the derailluer through a cable.

Referring now only to FIGS. 1–5, only left front wheel 138a is driven in cycle 100. The chain drive assembly 118 includes a gear cassette and free hub assembly 170. The gear cassette and free hub assembly 170 is mounted to a drive shaft extension that passes through an opening in the central beam 102. Journal bearings mounted within the central beam support the drive shaft for rotation. The chain drive 126 extends around one of the gears in the gear cassette. A "rear" derailluer 172 mounted to the center beam 102 using a conventional bracket, allows the rider to select the gear, or sprocket, that the chain will engage. The drive shaft extension is coupled to a telescoping drive shaft 173 through a universal joint 174. The opposite end of the telescoping drive shaft 173 is coupled through universal joint 176 to a drive axle that is journalled within the steering knuckle 144a. The telescoping drive shaft 173 includes an inner shaft that slides inside an outer shaft. The inner and outer shafts are coupled through a plurality of splines.

Referring now to FIGS. 8–14, cycles 200, 300 and 400 have both front wheels 138a and 138b coupled to the chain drive assembly 118. Like cycle 100 of FIGS. 1–5, the drive axle of left front wheel 138a is coupled to gear cassette and free hub assembly 170 through the telescoping drive shaft 173. The telescoping drive shaft is coupled through universal joint 174 to the drive shaft extension that is journalled within the central beam 102, and to the drive axle by universal joint 176. However, a drive axle journalled within steering knuckle 144b is driven by a second telescoping drive shaft 202 that is coupled to it through universal joint 206. The second telescoping drive shaft is also, like telescoping drive shaft 173, coupled to the drive shaft extension that is journalled within the central beam 102 through a universal joint 204.

Referring now to FIGS. 9 and 10, cycle 300 has, in addition to both front wheels 138a and 138b driven, both of its rear wheels 150a and 150b driven. To deliver rotational power from the chain drive assembly 118 to the rear wheels, a rear wheel drive or power train includes a sprocket 304 mounted to the drive shaft extension, which is journalled within the central beam 102, on the side of the central beam opposite the gear cassette and free hub assembly 170. A chain drive 302 extends from sprocket 304 to sprocket 306. Sprocket 306 turns axle 164.

Referring now to FIGS. 11–14, cycle 400 has, like cycle 300, all four wheels driven. It differs from cycle 300 (FIGS. 9 and 10) only in that the chain 302 and sprockets 304 and 306, as shown in FIGS. 9 and 10, are replaced with a rotating shaft 402 and beveled gears 404, 406, 408 and 410. Beveled gear 404 is mounted on the opposite side of the central beam 102 from the gear cassette assembly 170 to the drive shaft extension that is journalled within the central beam 102. Beveled gear 406 is attached to the forward end of the shaft 402 and couples with beveled gear 404 to transmit rotational power from the chain drive assembly 118 to the rear of the cycle. Beveled gear 408, which is mounted to the rear end of the shaft 402, turns bevel gear 410, which in turn rotates axle 164. The rotating shaft 402 is supported along its length by a plurality of journal support mounts 412.

Referring now to FIGS. 9–14, in both cycle 300 and 400, axle 164 rotates sprocket 308, which is mounted to axle 164 on the opposite of the central beam 102 from sprocket 306 in cycle 300 (FIGS. 9 and 10), and opposite beveled gear 410 in cycle 400 (FIGS. 11–14). The axle is journalled on by bearings mounted within the central beam. The swing arm assembly 152 is free to rotate on the ends of axle 164. Drive chain 310 couples sprocket 308 to drive sprocket 312. Drive sprocket 312 turns an axle that is rotationally mounted within, and that extends thought the horizontal member 154. The axle turns the rear wheels 150a and 150b.

The forgoing description is of preferred embodiments of the invention, undertaken for purposes of explaining the invention and enabling its practice. The invention, however, is not limited to the embodiments as described. Rather, the invention includes substitutions for, modifications, rearrangements and other alterations of, the described embodiments as and are contemplated by, and come within the scope of, the following claims.

What is claimed is:

1. A four-wheel, human powered cycle comprising:

an elongated, straight, central beam extending along an axis of the cycle;

a front suspension assembly depending from a front portion of the central beam, the front suspension including an independent left front suspension mounted to one side of the central beam, and an independent right front suspension mounted to an opposite second side of the central beam;

a rear suspension assembly depending from a rear portion of the central beam;

a set of cranks, each disposed on an opposite side of the central beam from the other crank;

a drive shaft coupled to at least one of the two front wheels receiving power from the set of cranks;

a seat disposed on the central beam, rearward of the set of cranks, the seat including a bottom support portion and a back support portion; and a steering shaft for turning the front wheels, the steering shaft terminating above the bottom support portion and forward of the back support portion of the seat.

2. The cycle of claim 1 wherein the independent front left and right suspensions each include a steering knuckle to which a front wheel is mounted, a steering column being coupled to the each of the steering knuckles to turn the wheels.

3. The cycle of claim 1 wherein the independent front left and right suspensions each include an upper and a lower A-arm, between which a steering knuckle is held.

4. The cycle of claim 1 wherein the seat is mounted to a track connected to the central beam for sliding the seat fore and aft and thereby adjusting the distance between the seat and the steering wheel and the set of cranks.

5. The cycle of claim 1 wherein, the central beam slopes upwardly with respect to ground from its front portion toward its rear portion when the cycle is in a normal operating position on the ground.

6. The cycle of claim 1 wherein the cranks turn a chain drive, the chain drive being coupled for transmitting power to a front wheel disposed on one of the independent left front or right front suspensions.

7. The cycle of claim 1 wherein the cranks turn a chain drive, the chain drive being coupled for transmitting power to a left front wheel mounted on the left front independent suspension, and a right front wheel mounted on the right front independent suspension.

8. The cycle of claim 7 wherein the chain drive is further coupled for transmitting power to left and right rear wheels mounted to the rear suspension.

9. A four-wheel, human powered cycle comprising:

a frame;

a set of cranks mounted on the frame;

a seat disposed on the frame, rearward of the set of cranks, the seat including a bottom support portion and a back support portion;

a steering shaft for turning the two front wheels;

a front suspension assembly depending from a front portion of the frame, the front suspension including an independent left front suspension and an independent right front suspension, the independent left and right front suspensions each including a steering knuckle to which a wheel is mounted, the steering shaft being coupled to the each of the steering knuckles to turn the wheels;

a drive shaft coupled to at least one of the two front wheels receiving power from the set of cranks; and a rear suspension assembly depending from a rear portion of the frame, on which is mounted two rear wheels.

10. The cycle of claim 9 wherein a chain drive mounted to the frame and powered by the set of cranks further comprises the chain drive being coupled to the drive shaft and wherein the drive shaft is a telescoping drive shaft extending to a drive axle mounted through the steering knuckle of the independent left or right front suspension.

11. The cycle of claim 10 wherein the chain drive includes a chain for coupling power from the cranks to a drive shaft extension rotationally mounted to the frame, and wherein the telescoping shaft is coupled at one end to the drive shaft extension through a first universal joint and at an opposite end to the drive axle through a second universal joint.

12. The cycle of claim 10 wherein the chain drive includes a chain for coupling power from the cranks to a drive shaft extension rotationally mounted to the frame, and wherein the drive shaft extension, telescoping shaft and drive axle are coupled through at least one universal joint.

13. The cycle of claim 12 wherein the chain drive further includes a plurality of chain rings mounted to the set of cranks and a gear cassette and free hub assembly mounted to the drive shaft extension, the chain extending between one of a plurality of chain rings and one of a plurality of gears comprising the gear cassette, the chain drive further including a first derailleur for moving the chain between the ones of the plurality of gears and a second derailleur for moving the chain between the plurality of chain rings.

14. The cycle of claim 12 further comprising a rear wheel drive coupled to the drive shaft extension for delivering power from the drive shaft extension to the rear wheels.

15. The cycle of claim 9 further comprising a chain drive mounted to the frame and powered by the set of cranks, the chain drive being coupled to the drive shaft and wherein the drive shaft is a telescoping drive shaft extending to a first drive axle mounted through the steering knuckle of the independent left front suspension, and wherein a second telescoping drive shaft extends to a second drive axle mounted through the steering knuckle of the independent right front suspension.

16. The cycle of claim 15 wherein the chain drive includes a drive shaft extension rotationally mounted to the frame, and wherein the drive shaft extension, the first telescoping shaft and first drive axle are interconnected through a first of at least one universal joint and the drive shaft extension, the second telescoping shaft and the second drive axle are interconnected through a second of at least one universal joint.

17. A four-wheel, human powered cycle comprising:

a frame including an elongated, straight, central beam extending along an axis of the cycle;

a front suspension assembly depending from a front portion of the central beam, the front suspension including an independent left front suspension mounted to one side of the central beam, and an independent right front suspension mounted to an opposite second side of the central beam, the independent front left and right suspensions each including a steering knuckle to which a front wheel is mounted;

a rear suspension assembly depending from a rear portion of the central beam;

a set of cranks, each disposed on an opposite side of the central beam from the other crank;

a semi-recumbent seat disposed on the central beam, rearward of the set of cranks, the seat including a bottom support portion and a back support portion;

a steering shaft coupled to each of the steering knuckles for turning the front wheels, the steering shaft terminating above the bottom support portion and forward of the back support portion of the semi-recumbent seat; and a chain drive mounted to the frame and powered by the set of cranks, the chain drive including a gear cassette and free hub assembly coupled to a first telescoping drive shaft that extends to a first drive axle mounted through the steering knuckle of one of the independent left and right front suspensions.

18. The cycle of claim 17 wherein the gear cassette and free hub assembly is coupled to a drive shaft extension rotationally mounted to the frame, and wherein the first telescoping shaft is coupled at one end to the drive shaft extension through a first universal joint and at an opposite end to the first drive axle through a second universal joint.

19. The cycle of claim 18 further comprising a rear drive coupled to the drive shaft extension for delivering power from the drive shaft extension to the rear wheels.

20. The cycle of claim 18 wherein, the other of the left front and right front suspensions has a second telescoping drive shaft that extends to a second drive axle mounted through the steering knuckle of such other of the left front and right front suspensions;

the gear cassette and free hub assembly is coupled to a drive shaft extension rotationally mounted to the frame;

the first and second telescoping shafts are coupled to opposite ends of the drive shaft extension through, respectively, first and second universal joints; and the first and second telescoping shafts are coupled, respectively, to the first and second drive axles through, respectively, third and forth universal joints.

21. The cycle of claim 17 wherein the independent left front and right front suspensions each include an upper and a lower A-arm pivotally mounted to the frame, the steering knuckle being held between the lower and upper A-arms and the lower A-arm being loaded by a dampened spring.

\* \* \* \* \*